United States Patent [19]

Stegall et al.

[11] Patent Number: 4,664,795
[45] Date of Patent: May 12, 1987

[54] TWO-STAGE WASTE WATER TREATMENT SYSTEM FOR SINGLE FAMILY RESIDENCES AND THE LIKE

[75] Inventors: William A. Stegall, Denham Springs; Marty E. Tittlebaum, Baton Rouge, both of La.

[73] Assignee: William A. Stegall, Denham Springs, La.

[21] Appl. No.: 715,648

[22] Filed: Mar. 25, 1985

[51] Int. Cl.⁴ .............................................. C02F 1/74
[52] U.S. Cl. .................................... 210/202; 210/220; 210/320; 210/532.2
[58] Field of Search ............... 210/201, 202, 205, 220, 210/320, 532.2

[56] References Cited

U.S. PATENT DOCUMENTS

| | | | |
|---|---|---|---|
| 3,764,011 | 10/1973 | Owens | 210/202 X |
| 3,878,101 | 4/1975 | Kennedy | 210/202 |
| 3,907,672 | 9/1975 | Milne | 210/202 X |
| 4,070,292 | 1/1978 | Adams | 210/206 X |
| 4,139,471 | 2/1979 | Foti | 210/202 X |

Primary Examiner—Tom Wyse
Attorney, Agent, or Firm—Pravel, Gambrell, Hewitt & Kimball

[57] ABSTRACT

An apparatus for the treatment of waste water from relatively small structures such as single family residences, dwellings and the like includes first and second vessels connected by a flow line, the first vessel including a waste water inlet and the second vessel including an outlet for the discharge of clarified water. A transverse baffle divides the second vessel into aeration and clarifier sections, the clarifier section including a transversely mounted inclined plate which prevents the accumulation of solid material in the clarified section and redirects the solid material back into the aeration section. A multiple angle discharge piping arrangement prevents clarified liquid from discharging the apparatus until it has made at least two right angle turns before reaching the discharge piping of the unit. Within the aeration chamber, aeration produces a rolling flow which includes a flow component that is generally from top to bottom adjacent the baffle, discouraging the flow of solid material into the clarifier.

8 Claims, 4 Drawing Figures

TWO-STAGE WASTE WATER TREATMENT SYSTEM FOR SINGLE FAMILY RESIDENCES AND THE LIKE

BACKGROUND OF THE INVENTION

The present invention relates to waste treatment systems and especially those waste treatment systems which are packaged on containerized units.

In the treatment of waste, there is often utilized a containerized or packed unit treatment plant which treats received waste product on an intermittent flow basis such as from a home or small structure or building. In the home building industry, for example, there is often utilized a buried, subsoil sewage treatment plant which can be used to primitively and primarily treat waste products. Such sewage treatment devices usually receive flow intermittently and must treat the flow in order to meet ecological and building standards. Oftentimes the unit is merely a holding or "septic" tank that removes settleable solids from a waste water stream. It is desirable that waste be treated such as as sewage in an economical way utilizing as little energy as possible and as few moving parts as possible. It is desirable that a minimum of sludge removal would be required since sludge disposal presents an extra problem. Further, the accumulation of sludge within the unit produces an undesirable, possibly corrosive attack on the unit itself. An accumulation of sludge within the unit further results in a deterioration of the treatment process.

It would be desirable that a waste water treatment apparatus produce a total homogenation of the fluids received from the waste stream in order that they be properly bio-degraded. Waste entering the unit would normally be heterogeneous in nature, containing solid waste material as well as some liquid material. A breakup of this material is necessary in order that it be treated properly.

In aerated treatment systems, a problem is faced in that a clogging of the aeration assembly which provides bubbles to the unit will cause a degeneration of the treatment process or in fact a total stoppage of air flow to the vessel, transferring the process from aerobic to anaerobic, thus removing any treatment capability. It would be desirable that the aeration unit or air diffuser be positioned to reduce or prevent clogging by solid material which may enter the unit.

SUMMARY OF THE INVENTION

The present invention provides a waste water treatment apparatus suitable for use in providing low cost waste treatment for small dwellings such as single family residences and the like. The apparatus includes a first fluid containing vessel having a fluid inlet disposed at the upper surface portion thereof and a fluid outlet disposed generally opposite the fluid inlet and also at the upper portion of the vessel. A second treatment vessel provides an inlet which communicates with the outlet of the first vessel so that supernatant liquid that is discharged from the first vessel can flow into the second vessel.

In the preferred embodiment, a pair of spaced apart, curved baffles extend above and below a defined water line of the first vessel, each baffle including curved sections which terminate at the outer wall of the first vessel and depend from the lid portion thereof. A bridge flow line provides a fluid connection between the first and second vessels allowing discharge of supernatant liquid from the second vessel to the second vessel. A generally vertically standing baffle wall extends transversely across the second vessel from one side wall portion to the opposite side wall portion thereof, terminating below the lid portion and above the bottom portion so that fluid must travel under the baffle in order to reach the fluid effluent discharge. An inclined plate is transversely positioned in the second vessel, terminating at a position adjacent the lower end portion of the baffle at the baffle opening. The inclined plane forms an acute angle with the bottom of the second vessel and prevents the accumulation of solid material on the downstream side of the baffle. An exit flow line is disposed at the upper portion of the second vessel and adjacent the effluent discharge, communicating therewith for providing multiple right angle turns for supernatent liquid that will be transmitted from the second vessel to the effluent.

An aeration diffuser is positioned within the second vessel, generally opposite the baffle for producing a rolling flow within the second vessel that includes a downward vertical flow component adjacent the upstream side of the baffle.

In the preferred embodiment, the exit piping includes a pair of tees which are connected together forming a vertical rise tube that connects perpendicularly with a generally horizontal effluent line.

In the preferred embodiment, the apparatus includes first and second vessels which are separate and spaced apart vessels. In the preferred embodiment, the baffle divides the second vessel into an aeration chamber and a clarifier chamber.

In the preferred embodiment, in order to produce a rolling flow as above-described, the aeration diffuser is positioned generally under the bridge line.

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF A PREFERRED EMBODIMENT

Figure 1:
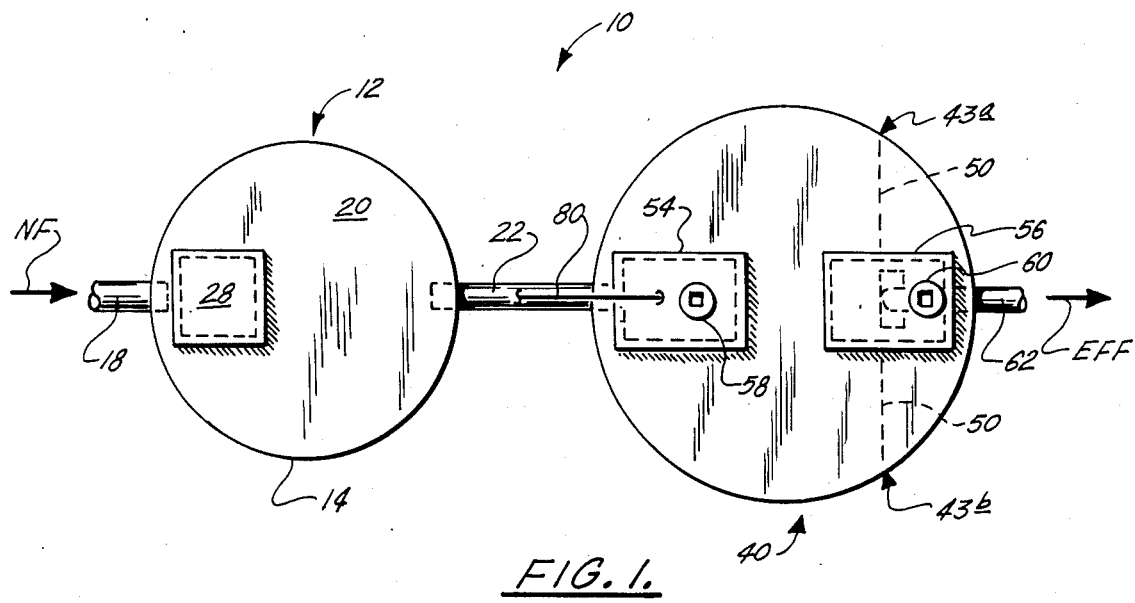
FIG. 1 is a top view of the preferred embodiment of the apparatus of the present invention.
Figure 2:
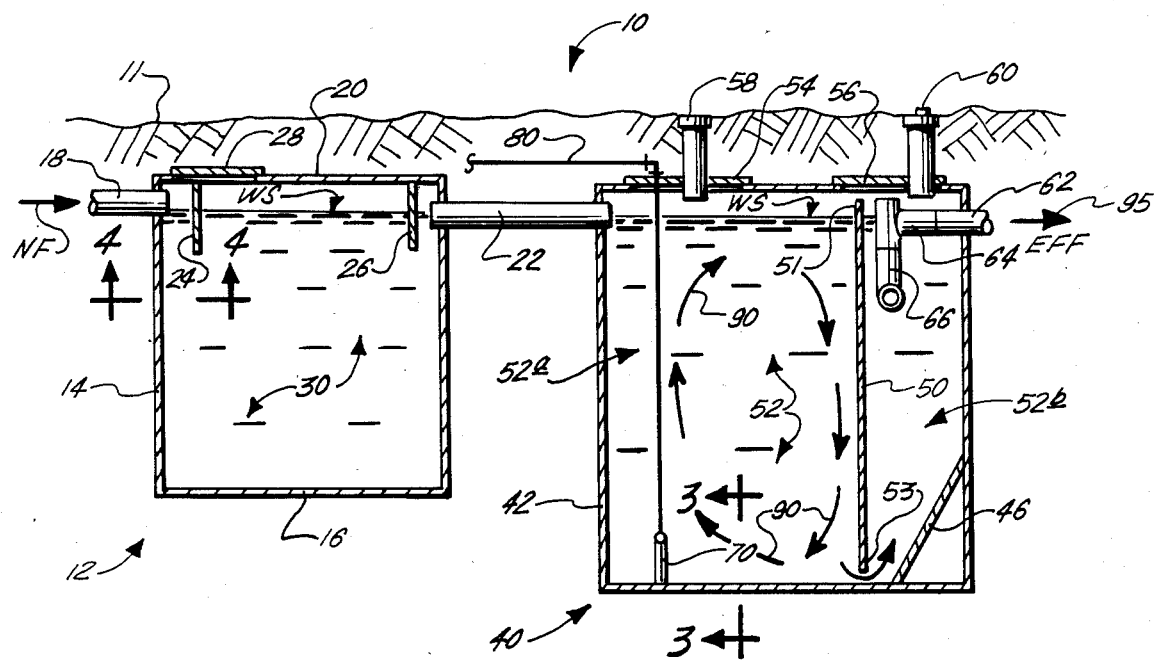
FIG. 2 is a side elevational cutaway view of the preferred embodiment of the apparatus of the present invention.

FIGS. 1 and 2 best show the preferred embodiment of the apparatus of the present invention designated generally by the numeral 10.

Waste treatment apparatus 10 includes a pair of preferably spaced apart fluid containing vessels 12, 40, each of which can be cylindrical in shape. Vessels or tanks 12, 40 can be buried under a soil mass 11 such as is known in the placement of septic tanks and the like. Vessel 12 includes a bottom 16, a cylindrical side wall 14, and a top 20. An influent pipe 18 receives a waste water fluid influent stream designated generally by the arrow INF in FIG. 2. The influent empties into the interior 30 of tank 12 having a water surface WS which is defined by the level of influent pipe 18, bridge flow line 22, and effluent line 62.

First vessel 12 includes a top 20 having an inspection or access opening 28 which can be, for example, rectangular as shown in FIG. 1 of the drawings. Notice that influent line 18, bridge line 22, and effluent opening 62 are all at generally the same elevation so that fluid flow will be maintained at a relatively constant elevation designated by the water surface WS in both first vessel 12 and second vessel 40.

Figure 4:
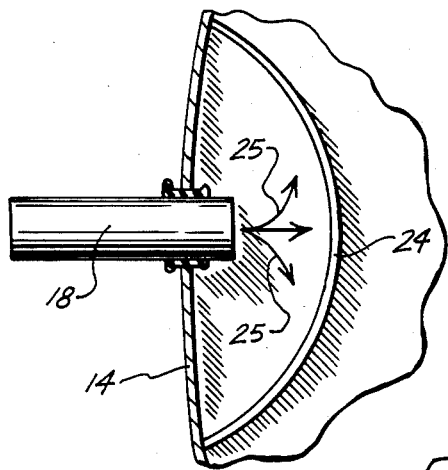
FIG. 4 is a sectional view taken along lines 4—4 of FIG. 2.

First vessel 12 includes a pair of spaced apart, curved baffle plates 24, 26, each of which is attached at its upper edge portion to top 20 and at its edge portions to cylindrical wall 14. Thus, baffles 24, 26 are arcuately shaped in the fragmentary plan view as shown by the detail of FIG. 4 (which illustrates baffle 24 only as an example of both baffles 24, 26). Arrows 25 in FIG. 4 indicate the flow discharging from influent line 18 into vessel 12 interior 30. Notice that the divergence of flow represented by arrows 24 shows that short circuiting of flow through the first vessel 12 will be prevented. Similarly, a second curved baffle 26 attaches at its edge portions to the cylindrical tank wall 14 to prevent short circuiting of flow into the bridge line 22, which connects first vessel 12 and second vessel 40.

The first vessel 12 is primarily a solids separation vessel, wherein settleable solid material falls from inlet 18 after hitting baffle 24 and accumulates upon the bottom 16 of first vessel 12. Only supernatent liquid will enter bridge flow line 22 and then continue into the interior 52 of second vessel 40.

Second vessel 40 is cylindrically shaped having a curved side wall 42, a generally flat and circular bottom 44 and a correspondingly shaped lid portion 48. Second vessel 40 includes one or more access openings 54, 56 as well as access ports 58, 60, which can be used to view the vessel interior 52a, 52b or to take samples on opposite sides of baffle 50. An upstanding, generally vertical baffle 50 extends from one side portion 43a of second vessel 40 to the opposite 43b side portion thereof, thus dividing the second vessel interior 52 into first 52a and second 52b interior portions. The first interior portion 52a defines an aeration chamber and the second interior portion 52b defines a clarifier. Notice that the uppermost end portion 51 of baffle 50 extends above water surface WS, thus preventing any short circuit flow over the top of upper edge 51 of baffle 50. The baffle has upstream 50a and downstream 50b sides that communicate respectively with the aeration chamber 52a and clarifier 52b. However, the bottom edge 53 of baffle 50 is spaced above the bottom 44 of second vessel 40 providing a flow opening which is designated by the curved arrow 55 in FIG. 2. One skilled in the art will recognize that fluid flow can only enter effluent piping 62 by proceeding downwardly to the bottom edge 53 of baffle 50 and then entering the tank section 52b following the path designated generally by the arrow 55 in FIG. 2. However, this path is against the flow path 90 generated within portion 52a by diffuser 70.

Figure 3:
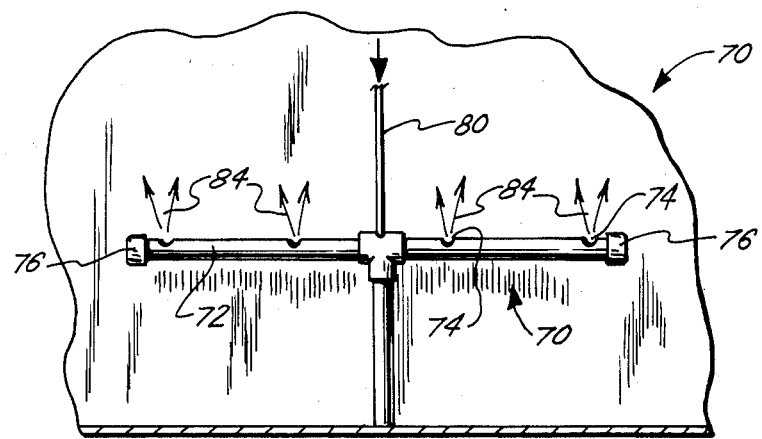
FIG. 3 is a sectional view taken along lines 3—3 of FIG. 2.

Air diffuser 70 (see FIG. 3) is positioned adjacent the bottom 44 of second vessel 40 and generally on the opposite side portion thereof from inclined plate 46 which is the upstream side of vessel 40. Air diffuser 70 is supplied by air flow line 80 which can be connected, for example, to an air compressor housed in a remote location. Diffuser 70, as best shown in FIG. 3, would include a pedestal 78 supporting a generally horizontal pipe section 72 having end caps 76 and including on its upper surface multiple orifice openings 74. Arrows 84 in FIG. 3 designate generally the flow of air through orifices 74. The orifices would be manufactured of a generally small diameter so that very small air bubbles could be produced to increase the mechanical breakup of air entering tank interior 52, and thus provide an enlarged surface area for oxygen exchange with a fluid waste product contained within tank interior 52. Because air diffuser 70 is positioned generally opposite inclined plate 46 as shown in FIG. 2, a generally circular forward and aft flow of fluid is achieved within vessel interior 52, such as designated by the multiple arrows 90 in FIG. 2. The flow of fluid adjacent baffle 50 is in a direction which generally moves fluid flow from the upper edge surface 51 of baffle 50 to the lower edge surface 53 thereof. Inclined plate 46 provides a highly inclined surface which catches any solid material which might inadvertently enter the clarifier section 52b of vessel 40. Because of the high inclined nature of plate 46, solid material will slide off the plate 46 back towards the opening 53 and not accumulate in clarifier 52b.

Effluent piping 62 includes a pair of connected tee sections 64, 66. Lower tee section 66 thus includes a pair of openings 68, 69 (FIG. 1) into which fluid can flow. However, the use of multiple tees as shown in FIG. 2 provides a simple inexpensive and effective means of preventing flow of solid material from supernatent section 52b into effluent piping 62 so that it can escape the second vessel 40 as indicated by the arrows 95 in FIG. 2. Thus, any fluid leaving the interior 52 of vessel 40 must make at least two ninety degree turns in order to escape the vessel.

The above apparatus can be manufactured, for example, of plastic, Fiberglass, steel, cast iron or the like. The above-described apparatus is highly efficient, yet simple to construct and maintain. The apparatus is a paragon of simiplicity, having minimal parts thus providing a very economical apparatus for the treatment of waste water leaving the home of, for example, a single family residence.

The preferred embodiment of the apparatus of the present invention was tested based upon an exemplary design flow of 500 gallons per day. In the exemplary test unit, raw unsettled domestic waste water was directed into the first vessel 12 where settleable solids settled from the flow stream and are to be generally degraded by anaerobic microorganisms. Supernatent waste water was then flowed into the aeration zone contained within the interior 52 of second vessel 40. In the test unit, the volume of the first vessel was approximately 280 gallons with an average detention time of, for example, 13-14 hours.

The second vessel 40 in the test unit had an exemplary volume of approximately 450 gallons and a detention time of approximately 22 hours at the average influent flow rate of 500 gallons per day. The second vessel is designed to maintain organic and inorganic solid materials and aerobic sludge in suspension with a general flow pattern as shown by the arrows 90 in FIG. 2. The aeration using diffuser 70 was continuous during the test operation in the exemplary test (see Tables 1, 2 and 3 for test results.)

Simple hydraulic displacement causes the influent waste water or mixed liquor to enter the clarifier 52b section of second vessel interior 42. The volume of the clarifier chamber 52b was approximately 120 gallons on the test unit as opposed to the 450 approximate gallon volume on the entire second vessel 40. Thus, the total volumetric capacity of the test unit was approximately 850 gallons. A sampling of the effluent line 62 was made on a regular timed basis with 15 minute interval control in checking the treatment capability of the test unit. Table 1 indicates the sampling requirements that were used for the test example.

TABLE 1

| | | | | | | Volatile | | | |
|---|---|---|---|---|---|---|---|---|---|
| | | | | | Suspended | Suspended | Settleable | | |
| | Type of | Frequency | DO | $BOD_5$ | Solids | Solids | Solids | Temp | |
| Sample Location | Sample | of Test | mg/l | mg/l | (SS), mg/l | (VSS), % | ml/30 min. | °C. | pH |
| Raw Influent | 24 hr. composite | Daily | | X | X | X | | X | X |
| Final Effluent | 24 hr. composite | Daily | X | X | X | X | | X | X |
| Aerator | Grab | Once/day | X | | X | X | X | X | X |

Sampling Requirements above.

Table 2 indicates a summary of the performance data for the test unit.

TABLE 2

Summary of Performance Data

| Test Period 4/5/84–10/5/84 | | Mean | Minimum | Maximum | Standard Deviation |
|---|---|---|---|---|---|
| Dissolved Oxygen (mg/l) | Aeration Chamber | 2.3 | 0.5 | 9.2 | — |
| | Effluent | 4.4 | 0.5 | 8.6 | — |
| 5-Day Biochemical Oxygen Demand (mg/l) | Influent | 215.4 | 99.6 | 599.0 | 52.8 |
| | Effluent | 17.1 | 1.0 | 59.1 | 12.7 |
| Suspended Solids (mg/l) | Influent | 194.4 | 47.0 | 694.0 | 121.3 |
| | Aeration Chamber | 3,295.0 | 90.0 | 6,600.0 | 979.8 |
| | Effluent | 11.1 | 0.7 | 45.8 | 9.9 |
| Volatile Suspended Solids (mg/l) | Influent | 185.5 | 33.0 | 642.0 | 72.2 |
| | Aeration Chamber | 2,770.0 | 228.0 | 5,200.0 | 692.2 |
| | Effluent | 7.7 | 0.3 | 41.3 | 12.6 |
| pH | Influent | 7.6 | 6.5 | 8.6 | — |
| | Aeration Chamber | 7.2 | 6.4 | 7.5 | — |
| | Effluent | 7.3 | 6.7 | 7.9 | — |
| Temperature (°C.) | Influent | 26.3 | 11.0 | 32.0 | — |
| | Aeration Chamber | 25.6 | 19.0 | 29.0 | — |
| | Effluent | 26.2 | 13.9 | 32.0 | — |
| Settleable Solids (30 minute, ml/l) | Aeration Chamber | 817.1 | 190.0 | 980.0 | 202.1 |

Table 3 indicates a summary of the removal efficiencies for the test unit.

TABLE 3

Summary of Removal Efficiencies

| | Number of Observations | Influent Mean (mg/l) | Effluent Mean (mg/l) | Reduction (mg/l) | Percent Reduction |
|---|---|---|---|---|---|
| 5-Day Biochemical Oxygen Demand (mg/l) | 118 | 215.4 | 17.1 | 198.3 | 92 |
| Suspended Solids (mg/l) | 120 | 194.4 | 11.1 | 183.3 | 94 |

The foregoing description of the invention is illustrative and explanatory thereof, and various changes in the size, shape and materials, as well as in the details of the illustrated construction may be made without departing from the spirit of the invention.

We claim:

1. A waste water treatment apparatus comprising:

a. a first fluid containing vessel defining an anaerobic, primary settling tank having a bottom, a continuous sidewall, and a top lid portion;

b. a fluid inlet disposed at the upper surface portion of the vessel;

c. a fluid outlet disposed opposite the vessel inlet;

d. a second treatment vessel spaced from the first vessel and defining an aerobic aeration chamber having an inlet which communicates with the outlet of the first vessel so that supernatent liquid that is discharged from the first vessel can enter the second vessel;

e. a pair of spaced apart baffles extending above and below a defined water line of the first vessel, each baffle including curved sections which terminate at the outer wall of the first vessel and depending from the lid portion thereof;

f. a bridge flow line connecting the fluid outlet of the first vessel with the inlet of the second vessel for transmitting supernatent liquid from the first vessel to the second vessel;

g. a fluid effluent discharge positioned on the second vessel generally opposite the bridge flow line:

h. a generally vertically standing baffle extending transversely across the second vessel from one edge wall portion to the opposite edge wall portion thereof, terminating above the bottom portion thereof at a defined baffle opening, so that fluid flow in the second vessel travels under the baffle in order to reach the fluid effluent discharge;

i. an inclined plate transversely disposed in the second vessel, terminating at a position adjacent the lower end portion of the baffle at said baffle opening, the inclined plane forming an acute angle with the bottom of the second vessel;

j. exit flow line means disposed at the upper portion of the second vessel, adjacent the effluent and communicating therewith for providing multiple right angle turns for supernatent fluid that will be transmitted from the second vessel to the effluent and including a downwardly extending portion that receives water flow at a position under the water surface on the downstream side of the second baffle; and k. aeration means for producing a rolling flow within the second vessel that includes a downward vertical flow component adjacent the upstream side of the baffle.

2. The waste water treatment apparatus of claim 1, wherein the effluent comprises a pair of flow inlets forming a tee with a vertical rise tube that connects perpendicularly with a horizontal effluent pipe.

3. The waste water treatment apparatus of claim 1, wherein the first and second vessels are spaced apart, separate vessels.

4. The waste water treatment apparatus of claim 1, wherein the vertically standing baffle is positioned between the aeration means and the effluent.

5. The waste water treatment apparatus of claim 1, wherein the aeration means is positioned generally vertically under the bridge line.

6. A waste water treatment apparatus comprising:
 a. a first, anaerobic fluid containing vessel having a top, a bottom and a continuous sidewall;
 b. a flow inlet for introducing a waste water stream into the anaerobic vessel;
 c. a flow outlet for discharging a fluid stream from the anaerobic vessel;
 d. a second, aerobic fluid containing vessel having a top, a bottom and a continuous sidewall;
 e. a flow inlet for introducing a fluid stream into the second, aerobic vessel;
 f. a flow outlet for discharging fluid from the second aerobic vessel;
 g. a bridge flow line connecting the flow outlet of the first anaerobic vessel and the flow inlet of the second, aerobic vessel, the respective fluid inlets, fluid outlets and bridge lines being positioned at the upper end portion of the vessels to define a gravity flow water surface for the first and second vessels;
 h. at least one first transverse, vertically standing baffle extending across the first anaerobic tank, above and below the water surface;
 i. a second transverse vertically standing baffle extending across the second aerobic vessel from above the water surface to a position below the water surface terminating near the bottom of the vessel to define a baffle opening so that fluid flow in the second vessel travels under the second baffle;
 j. exit flow line means disposed at the upper portion of the second vessel, adjacent the effluent and communicating therewith for providing multiple right angle turns for supernatent fluid that will be transmitted from the second vessel to the effluent and including a downwardly extending portion that receives water flow at a position under the water surface on the downsteam side of the second baffle; and
 k. aeration means for producing a rolling flow within the second vessel that includes a downward vertical flow component adjacent the upstream side of the baffle.

7. The apparatus of claim 6, further comprising an inclined plate transversely disposed in the second vessel, terminating at a position adjacent the lower end portion of the baffle at said baffle opening, the inclined plane forming an acute angle with the bottom of the second vessel.

8. The apparatus of claim 7 wherein there are a pair of baffles positioned respectively adjacent the flow inlet and flow outlet of the first anerobic chamber.

* * * * *